United States Patent [19]

Rao

[11] Patent Number: 4,999,993
[45] Date of Patent: Mar. 19, 1991

[54] REACTOR EXPANDER TOPPING CYCLE

[75] Inventor: Ashok D. Rao, Irvine, Calif.

[73] Assignee: Fluor Corporation, Irvine, Calif.

[21] Appl. No.: 391,684

[22] Filed: Aug. 9, 1989

Related U.S. Application Data

[63] Continuation of Ser. No. 125,124, Nov. 25, 1987, abandoned.

[51] Int. Cl.⁵ .................................................. F02C 3/28
[52] U.S. Cl. .................................... 60/39.02; 60/39.12
[58] Field of Search .................. 60/39.02, 39.06, 39.12, 60/39.462, 723; 518/703, 704, 705; 568/881, 883, 896

[56] References Cited

U.S. PATENT DOCUMENTS

| | | | |
|---|---|---|---|
| 3,765,167 | 10/1973 | Rudolph et al. | 60/39.12 |
| 3,928,961 | 12/1975 | Pfefferle | 60/723 |
| 4,185,456 | 1/1980 | Cummings | 60/39.12 |
| 4,433,065 | 2/1984 | van der Burgt et al. | 518/703 |
| 4,549,396 | 10/1985 | Garwood et al. | 518/703 |
| 4,594,850 | 6/1986 | Joy | 60/723 |
| 4,631,915 | 12/1986 | Frewer et al. | 60/39.12 |
| 4,663,931 | 5/1987 | Schiffers et al. | 60/39.12 |
| 4,759,178 | 7/1988 | Joy | 60/39.462 |

FOREIGN PATENT DOCUMENTS

| | | |
|---|---|---|
| 0259114 | 3/1988 | European Pat. Off. |
| 8620919 | 4/1988 | United Kingdom |
| 8628429 | 4/1988 | United Kingdom |

Primary Examiner—Louis J. Casaregola
Attorney, Agent, or Firm—Lyon & Lyon

[57] ABSTRACT

An improved method for producing mechanical work from synthesis gas streams by exothermic, catalytic reaction of the stream, partial conversion to mechanical work by use of an expansion turbine and further conversion to mechanical work in a downstream heat engine.

3 Claims, 2 Drawing Sheets

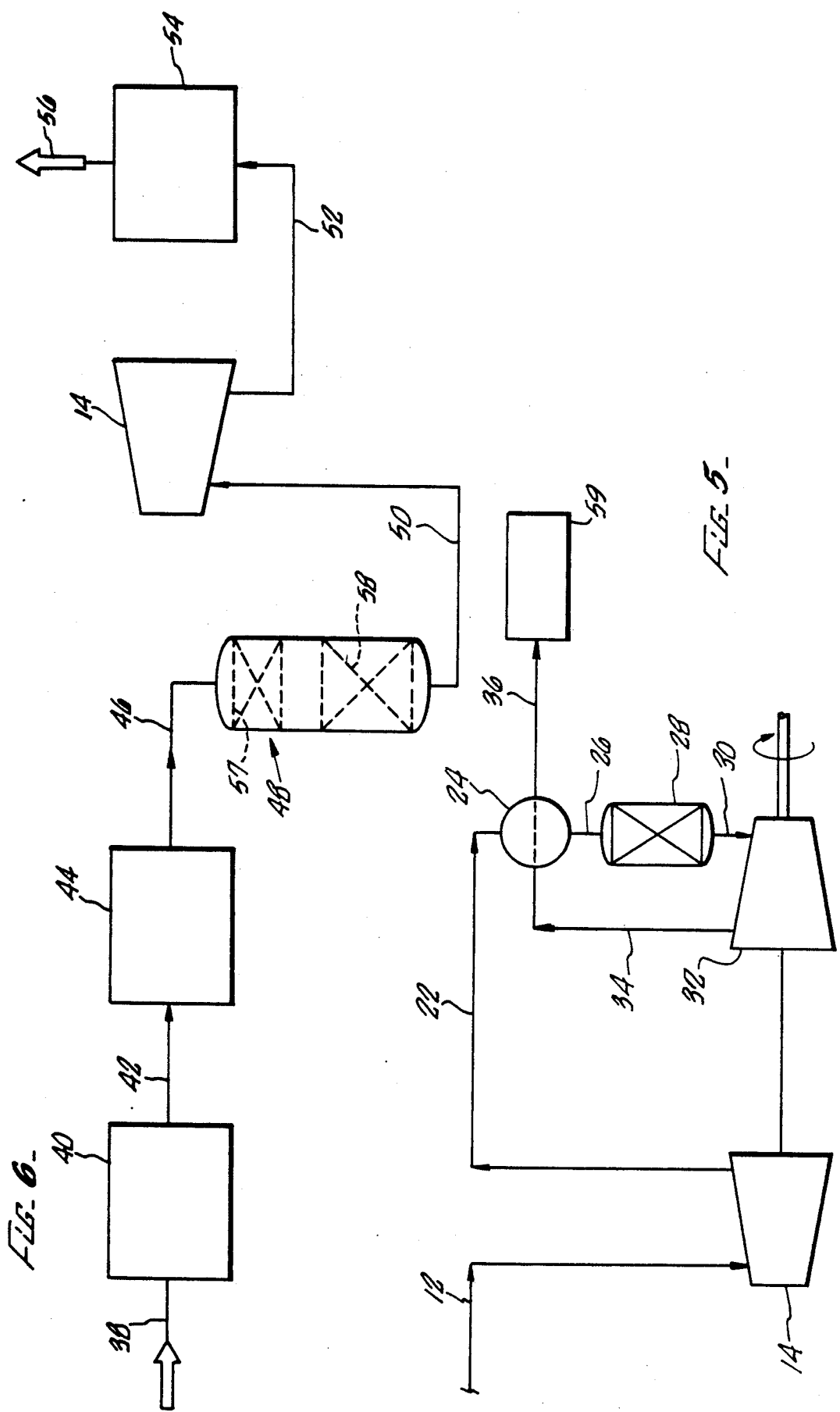

REACTOR EXPANDER TOPPING CYCLE

This is a continuation of co-pending application Ser. No. 125,124 filed on Nov. 25, 1987 (abandoned).

FIELD OF THE INVENTION

This invention relates to an improved process for converting thermodynamic energy contained in certain combustible gas streams into mechanical work. Combustible streams contemplated for use in this invention include industrial gas streams that are available under pressure and capable of exothermically reacting in the presence of suitable catalyst. The process of the present invention uses a catalytic reactor in combination with a turboexpander, also known as an expansion turbine.

OBJECT OF THE INVENTION

An object of the present invention is a conversion of a portion of the thermodynamic energy contained in a reactive combustible gas stream to mechanical work at very high thermodynamic efficiency by means of a catalytic reactor and an expansion turbine, prior to converting the remaining available portion of the thermodynamic energy to mechanical work or electric power in one of the less efficient, known combustion or electrochemical processes.

DESCRIPTION OF PRIOR ART

Known systems for producing mechanical work from thermodynamic energy contained in combustible gas streams convert thermodynamic energy into heat by combustion and then convert that heat to mechanical work in a heat engine. The mechanical work in turn may be utilized to drive machinery or a power generator to produce electric power.

Examples of gas streams suitable for use in the present process are purge streams from certain synthesis processes, such as methanol, ammonia and oxo alcohol; and known low-Btu fuel gas and synthesis gas streams produced by steam/hydrocarbon reforming processes or by gasification or partial oxidation of hydrocarbonaceous and/or carbonaceous materials such as coal gasification.

In present practice, when thermodynamic energy in such a gas stream is to be converted into mechanical work, the gas is subjected to combustion in a heat engine, as for example a steam boiler-turbine system, a combustion turbine or an internal combustion piston engine. Alternatively, thermodynamic energy contained in such gas streams may be converted directly to electric power by an electrochemical oxidation reaction in a fuel cell, which reaction for the purposes of this invention is equivalent to combustion.

In a steam boiler-turbine system, fuel is first combusted; then the heat thus released is used to generate steam, which in turn drives a steam turbine. A substantial amount of energy is lost as heat escaping to the environment, first through the stack gases from the steam boiler and then through the steam condenser at the outlet of the steam turbine. These losses of heat to the environment are the major factors in establishing the overall efficiency of the energy conversion in such system. Thus, in spite of the highly efficient way in which the turbine converts heat to mechanical work, the overall thermal efficiency of such systems is typically 25 to 35 percent.

Combustion turbines can achieve higher overall thermodynamic efficiency than steam boiler-turbine systems because they can operate with a higher temperature at the inlet to the turbine, but they too suffer from limitations inherent in the combustion process. First, thermodynamic energy contained in a fuel is converted to heat by combusting the fuel with pressurized air in a combustor, and then the combustion products are expanded through a turbine to convert thermal energy into useful mechanical, or shaft, work. The hot gas expander portion of the combustion turbine system is an extremely efficient device, capable of recovering as useful mechanical work up to approximately 85% of the thermodynamically recoverable energy. Nevertheless, the overall system thermal efficiency in today's best combustion turbine systems is only about 30-35% as a result of factors related to the combustion process. In general, the thermal efficiency of the combustion turbine system is at a maximum when the combustion temperature itself is at a maximum. This occurs when the fuel is burned in the presence of air under stoichiometric conditions, that is, with just enough air for complete combustion, but without excess. When fuel oil is burned in the presence of air at stoichiometric conditions, however, the resulting temperature may be as high as approximately 4000° F., which temperature is in excess of the metallurgical limits of state of the art turbines. Consequently, a large excess of air is introduced into the combustion step to act as a thermal diluent by reducing the temperature of the combustion products to a range of 1800° F. to 2300° F., depending on the materials of construction and design of the turbine involved. Also, this large excess of air, which must be compressed, creates a significant parasitic load on the system, and thus additionally reduces the useful work produced from the system and the overall efficiency of the system.

The thermal efficiency of internal combustion piston engines is also low as a result of factors related to the combustion process, and in today's best systems is about 30-35%.

A direct method of producing electric power from a fuel gas is through the use of a fuel cell system. However, such a system produces not only direct current electric power but also uses air, i.e., oxygen for electrochemical reactions, which results in a large quantity of flue gas, carrying with it the unconverted energy in the form of heat. Only about 30-50% of the available thermodynamic energy fed to fuel cells is converted to electricity, with the rest being converted to heat. Consequently, for large cell systems it is necessary to provide relatively great amounts of cooling. Methods have been proposed for recovering some of the discharged heat, as for example by generating steam to operate an auxiliary steam turbine. Even so, the inherent inefficiencies of such systems make them less than optimum. For example, a large fraction of the heat contained in the steam that would be fed to the auxiliary turbine is rejected to the environment in the condenser at the outlet of the turbine.

SUMMARY OF THE INVENTION

In order to fully appreciate the significance of the present invention, it must be recognized that in each of the presently known systems employing combustion or electrochemical processes, the thermodynamic inefficiencies cause a certain amount of heat to be lost in the systems' exhaust stream by virtue of the physical state of the gas stream; whereas in the present system chemical reactions that take place in the gas streams increase the portion of recoverable energy in the stream without introducing additional heat losses to the system and a portion of the recoverable energy is converted to useful work prior to introducing the gas stream to the combustion or electrochemical process.

These concepts may be visualized by inspecting the block flow diagrams depicted in FIGS. 1 and 2.

FIG. 1 presents the energy disposition in a conventional energy conversion system having an efficiency of 50 percent. If 100 units of energy enter the system, 50 units of useful mechanical work are produced and 50 units of energy are lost as heat to the environment.

FIG. 2 presents the energy disposition in an energy conversion system using the present invention with a reactor/expander step upstream of a conventional heat engine. If 100 units of energy enter the reactor/expander step, and if 10 units of energy are chemically converted into more efficiently recoverable energy, i.e., a higher temperature gas stream which is at a temperature low enough to be fed into an expansion turbine without dilution, and then converted into mechanical work in that step, the remaining 90 units of energy will enter the downstream conventional heat engine, also known as a bottoming cycle. With a 50 percent efficiency for this bottoming cycle, 45 units of useful mechanical work, i.e., 50% of 90 units of energy, are produced with only the remaining 45 units of energy lost as heat to the environment. The total useful mechanical work produced by this two-step system is then 55 units, i.e., 10 plus 45, which is 10 percent higher than the previous case, a significant improvement in the energy conversion efficiency.

The present invention provides a three-step, improved conversion efficiency process for producing useful mechanical work from certain gas streams. The first step, which operates at near-ideal thermodynamic efficiency, utilizes a catalytic, exothermic reaction to chemically convert a part of the thermodynamic energy contained in the gas streams to heat, and the second step utilizes an expansion turbine, also known as a turboexpander, to convert the produced heat into useful mechanical work. The third step employs a conventional heat engine or a fuel cell to convert the remaining available thermodynamic energy in the gas stream to useful mechanical work or electric power. The process is appropriate for use with a variety of combustible gas streams available at pressure and capable of exothermically reacting in the presence of a catalyst, as for example synthesis gas from a steam/hydrocarbon reforming process or from gasification or partial oxidation of hydrocarbonaceous and/or carbonaceous materials, or purge gas from certain synthesis processes such as methanol, ammonia or oxo alcohol.

When the third step is a fuel cell system an added advantage may be realized because the components formed in the reactions in the catalytic reactor e.g., methane and water vapor, may serve as heat sinks to absorb the large quantities of heat liberated within the fuel cell. In the first step hydrogen and carbon oxides e.g., CO, $CO_2$, may be exothermically reacted in the reactor to form methane. Within the fuel cell itself, the methane may then be endothermically reacted in a reforming reaction with water vapor to form hydrogen and carbon oxides using the heat liberated within the fuel cell as heat source. A fuel cell capable of such internal reforming has been developed by Energy Research Corporation and is described in Energy Research Corporation Final Report EM-4179, *Parametric Analysis of a 6500-Btu/kWh Heat Rate Dispersed Generator,* August, 1985.

BRIEF DESCRIPTION OF THE DRAWINGS

FIG. 5 is a schematic diagram of an alternate preferred embodiment of the present invention as applied to purge gas from a methanol synthesis plant.

FIG. 6 is a schematic diagram of another preferred embodiment of the present invention utilizing a partial oxidation or gasification plant to produce a fuel gas stream under pressure and containing components capable of reacting exothermically with each other or with water vapor.

DESCRIPTION OF THE PREFERRED EMBODIMENTS

The present invention involves several stages including the steps of first converting a portion of the thermodynamic energy contained in certain gas streams available under pressure to heat by one or more exothermic catalytic reactions between components contained in the gas stream. The catalytic reactions produce heat in a manner such that the heat can be more efficiently converted to mechanical work than by the existing combustion methods.

In the following paragraphs, the process of the present invention is described using two examples.

In the first example, the gas stream is a purge stream from a high-pressure synthesis loop, such as from a methanol synthesis plant. In the second example, the gas stream is the product from a coal gasification plant that is fed to a gas turbine or a fuel cell.

The present inventive concept can be applied to a wide variety of process plants having gaseous streams available to be used as fuel such that the streams are at pressure and contain components capable of reacting exothermically with each other or with water vapor which may be included in the stream or added separately.

EXAMPLE 1

METHANOL SYNTHESIS PLANT

By reference to FIGS. 3-4, the present invention as adapted for use in a methanol synthesis plant will be described. The FIG. 3 schematic flow diagram depicts a known method for recovering energy from purge gas in line 12 leaving the synthesis loop of a methanol synthesis plant. Such purge gas typically contains about 83% by volume of $H_2$, 2% by volume of CO and $CO_2$ each, 10% by volume of $CH_4$, and 3% by volume of inert gases. Preheated purge gas from the synthesis loop enters a single expander turbine 14 from stream 12. After producing useful mechanical work through expansion and temperature drop, the stream leaves expansion turbine 14 in stream 16 where it subsequently can be used as fuel in a downstream conventional heat engine 59, also known as a bottoming cycle. Assuming typical conditions for a plant having a capacity of 1200 STD methanol, and a feed gas stream 12 at 233° C. and 6900 kPa, an expander having a typical insentropic efficiency of 80 percent would produce about 4219 KW with an exit stream 16 at 21° C. and 450 kPa. However due to various mechanical and generator losses, typically about 2 percent of the gross power developed, the net power output is 4135 KW. The available thermodynamic energy remaining in the gas stream 16 leaving the expansion turbine 14 may be converted in a downstream heat engine 59 to useful mechanical work of about 75,367 KW assuming a 35 percent thermal efficiency of the heat engine.

Figure 4:
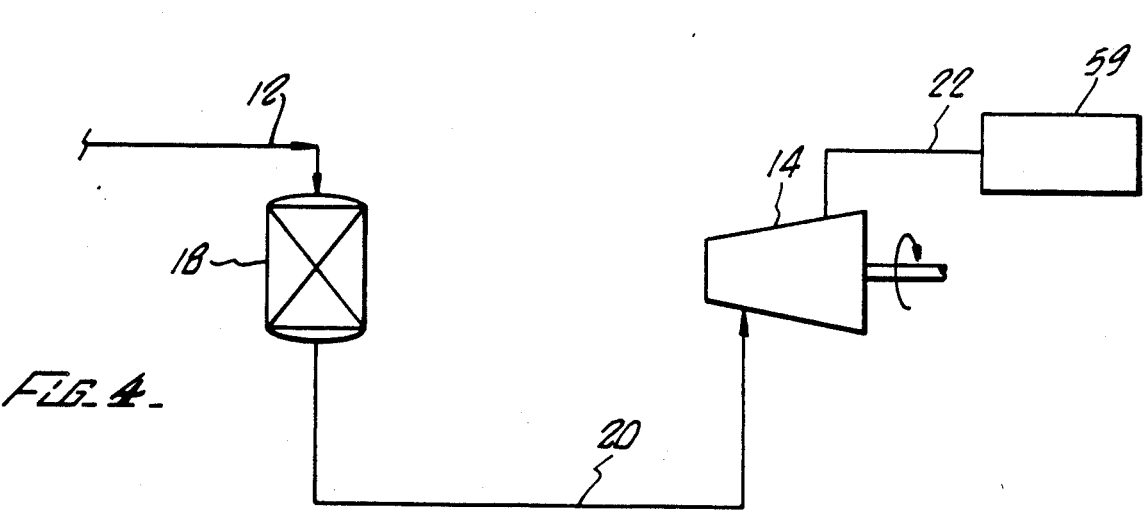
FIG. 4 is a schematic diagram of a preferred embodiment of the present invention applied to purge gas from a methanol synthesis plant.

Referring to FIG. 4, a simple schematic diagram of a preferred embodiment of the present invention is shown. A catalytic exothermic reactor 18 is employed upstream of the expansion turbine 14. The exothermic reactor may contain one or more separate catalytic beds, not shown, through which the hot gas stream 12 would pass sequentially. The catalysts contemplated in this invention are well known to those skilled in the art as ones promoting exothermic reactions between the components of the feed stream 12. Those reactions include but are not limited to:

| Reactants | | Products |
|---|---|---|
| (1) $CO + H_2O$ | → | $CO_2 + H_2$ |
| (2) $CO + 3H_2$ | → | $CH_4 + H_2O$ |
| (3) $CO_2 + 4H_2$ | → | $CH_4 + 2H_2O$ |

Upon completion of the passage through the exothermic reactor 18, the temperature of a typical methanol plant purge stream 20 would have increased to approximately 498° C., and is at a pressure of approximately 6830 kPa. This gas now typically contains about 74% by volume of $H_2$, 16% by volume of $CH_4$, and 3% by volume of inert gases. The pressure at various locations in the system is in accordance with well known principles of hydraulics.

The hot, high pressure gas in line 20 is then introduced into the turboexpander 14, in which the gas in expanded, as is well understood by those skilled in the art, with the exiting gas in line 22 being at a pressure of approximately 450 kPa and a temperature of about 196° C. The useful mechanical work produced in the expander is about 5904 KW. The mechanical work produced by expansion within turboexpander 14 may drive machinery, such as a compressor, or drive a generator for the production of electrical power. Any inefficiencies in the expander process due to mechanical non-idealities, such as friction, raise the temperature of the turbine expander exhaust and augment the heating value when that stream is combusted in a downstream heat engine.

The available thermodynamic energy remaining in the gas stream leaving the reactor/expander step may be converted in a downstream heat engine to useful mechanical work of about 74,748 KW assuming a 35 percent thermal efficiency of the heat engine.

Another preferred configuration of the present invention is shown in FIG. 5 where a pair of expander turbines is utilized. Feed stream 12 passes through an initial expander turbine 14. Exhaust stream 22 from turbine 14 is fed to catalytic reactor 28 and the reacted gases from reactor 28 are fed through line 30 into a second turbine 32. The exhaust from turbine 32 is fed through line 34 to heat exchanger 24 to heat the exhaust from turbine 14 prior to introduction into reactor 28, thereby raising the temperature of stream 26 prior to its being fed to the exothermic reactor 28 and lowering the temperature of stream 36 prior to its being passed on to a downstream heat engine 59. Alternatively, a second catalytic reactor may be used in stream 12 prior to turbine 14 under certain conditions such as when the total volume of reactive gases in stream 12 would make such a system practical in accordance with known principles.

Typical operating conditions might have stream 22 at 165° C. and 3450 kPa, stream 26 at 233° C. and 3410 kPa, stream 30 at 498° C. and 3340 kPa, stream 34 at 266° C. and 450 kPa, and stream 36 at 195° C. and 450 kPa. Such a scheme, given mechanical turbine inefficiencies, would produce about 5941 KW. The useful mechanical work produced in the downstream heat engine amounts to about 74,735 KW assuming a 35 percent thermal efficiency of the heat engine 59.

Another preferred embodiment of the same configuration as in FIG. 5 could use a catalyst capable of operating at higher temperatures. This might result in typical operating conditions having stream 22 at 134° C. and 2410 kPa, stream 26 at 388° C. and 241 kPa, stream 20 at 648° C. and 2310 kPa, stream 34 at 422° C. and 450 kPa, and stream 36 at 156° C. and 450 kPa with the pressures in accordance with known principles of hydraulics. With mechanical turbine inefficiencies, this configuration would produce about 6611 KW. The useful mechanical work produced in a downstream heat engine amounts to about 74,500 KW assuming a 35 percent thermal efficiency of the heat engine.

Other configurations of the reactor/expander process, depending upon the purge gas composition and operating conditions, may be devised and are considered to be within the scope of the present invention.

Figure 1:
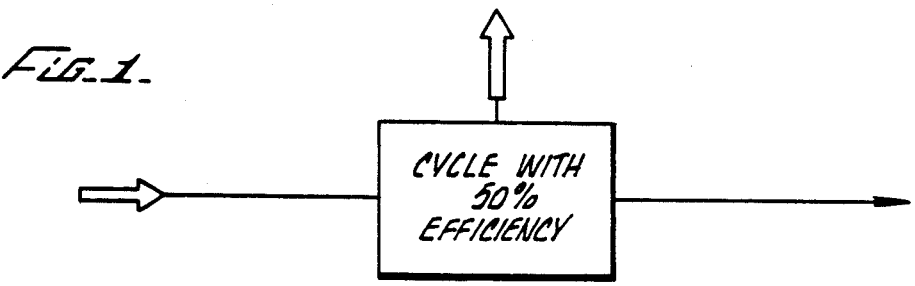
FIG. 1 is a schematic diagram of a conventional energy conversion system.
Figure 2:
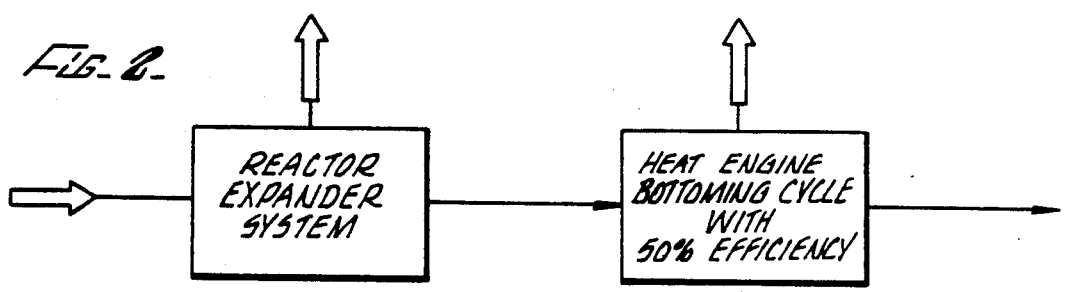
FIG. 2 is a schematic diagram of the energy conversion system of the present invention.
Figure 3:
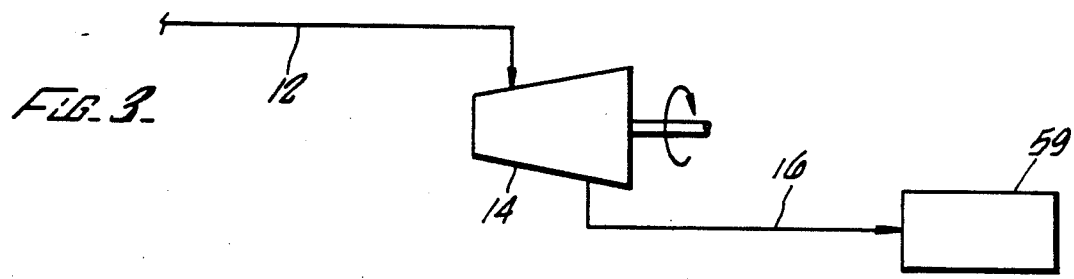
FIG. 3 is a schematic diagram of a typical conventional energy recovery system in which the fuel gas is a purge gas from a methanol synthesis plant.

The following summarizes the results of using the method of the present invention:

|  | FIG. 3 Base Case Expander | FIG. 4 Reactor/ Expander | FIG. 5 Reactor/ Expanders Low Temp. Cat | FIG. 5 Reactor/ Expanders Hi Temp. Cat |
|---|---|---|---|---|
| Expander Power, KW | 4,135 | 5,904 | 5,941 | 6,611 |
| Bottoming Cycle Power, KW(1) | 75,367 | 74,748 | 74,735 | 74,500 |
| Total Power, KW | 79,502 | 80,652 | 80,676 | 81,111 |
| Increase in Power Output over Base Case, % | — | 1.45 | 1.48 | 2.02 |

(1)Assuming a thermal efficiency of 35 percent

As can be seen, the addition of a reactor/expander step results in an increase in the amount of useful mechanical energy being generated in the expander and in a decrease in the amount of useful mechanical work being generated in the subsequent heat engine. The total amount of mechanical work being generated, however, shows a net increase in every case when the reactor/expander process is used. The efficiency of the energy conversion in the reactor/expander step is about 98 percent and is only affected by mechanical and electrical non-idealities.

As previously noted, the inefficiencies in the reactor/expander process do not result in any additional loss of energy, but rather convert a portion of the thermodynamic energy more efficiently into mechanical work, and then pass the remaining gas stream to a less efficient, downstream combustion heat engine.

EXAMPLE 2

COAL GASIFICATION BASED POWER PLANTS

The process of the present invention has particular application in conjunction with coal gasification based power plants. An example of such a system is shown in simplified form in FIG. 6 for a coal gasification-based combined cycle power plant, or fuel cell power plant. Coal 38 is fed to the gasification plant 40 at pressure and the produced gas stream 42 therefrom is then humidified, not shown, and then, optionally, preheated in step 44. Next, the humidified gas 46 is fed to a catalytic exothermic reactor 48 where the hydrogen, carbon oxides and water vapor react to form methane and produce heat. The resulting hot gas 50 is expanded through a turbine 14 to produce mechanical work. The now lower temperature, lower pressure gas 52 can be fed to a gas turbine system 54. The improvement in heat-rate for Texaco gasification based combined cycle power plants, as described in EPRI report No. AP-3486, using the reactor/expander system, ranges from 2 to 6 percent depending on the gasifier waste heat recovery option used, where heat-rate refers to the efficiency of converting fuel energy into electric power. The gases leaving the expander may be fed to a fuel cell instead of a gas turbine. The advantage in using this process with a fuel cell is that the components, such as $CH_4$, $CO_2$ previously formed by the exothermic reactions can now be used as heat sinks to absorb the large quantities of heat liberated within a fuel cell by reversing the earlier exothermic reactions to endothermnic reforming reactions.

For example, hydrogen and carbon oxides may be reacted to form methane in the exothermic reactor. Within the fuel cell itself, the methane may endothermically react with water vapor to form hydrogen and carbon oxides. Such a fuel cell capable of internal reforming has been developed by Energy Research Corporation, as disclosed in Energy Research Corporation Final Report EM-4179, *Parametric Analysis of a 6500-Btu/kWh Heat Rate Dispersed Generator*, August, 1985. Such a method uses the heat produced at low pressure, thereby avoiding the inefficient bottoming heat rejection and shifts energy upstream to the higher pressure, higher temperature area where it can be more efficiently used.

Thus, by coupling the reactor/expander with the fuel cell, a larger portion of the heat evolved in the cathode section of the fuel cell, where the oxidant is introduced, is transferred to the anode section rather than being transferred to the inefficient bottoming steam cycle. In the anode section this heat is converted to thermodynamic fuel energy and finally to power at a much higher efficiency corresponding to the combined fuel cell/bottoming steam cycle efficiency, rather than being converted simply at the bottoming cycle efficiency.

The particular examples 1 and 2 discussed above involve only a single exothermic reaction, although the reactor may have several sequential steps contained within it, as shown, for example, by the cross-hatched sections 57, 58 in FIG. 6.

Optionally and within the scope of the present invention various configurations may be constructed whereby a series of exothermic reactors would be interspersed with a series of turboexpanders. Such an arrangement may be used with or without recompression of the gas after any of the turboexpanders.

The process of the present invention may also be utilized, as indicated above, with other feed streams such as produced synthesis gases. Gases which can be used in this invention include low and medium BTU gases produced by partial oxidation of hydrocarbonaceous and/or carbonaceous materials such as coal, coke, petroleum residuals, also known as resids, agricultural and municipal waste, etc. The gases include mixtures of hydrogen, carbon monoxide, carbon dioxide, methane, and also sometimes nitrogen which in this invention is inert.

In light of the foregoing description, certain variations and modifications of the process of the present invention will become apparent to those skilled in the art. It is accordingly to be understood that all such modifications and variations are to be considered within the scope of the present invention.

I claim:

1. A process for producing mechanical work from a reactive gas stream comprising the steps of:
   selecting said reactive gas stream from a synthesis process which yields a gas stream containing hydrogen, carbon monoxide, carbon dioxide and methane;
   feeding said reactive gas stream at a first temperature and under pressure to a catalytic reactor containing suitable catalyst;
   reacting the reactive gas stream in one or more reactors without $O_2$ and using at least one exothermic reaction to produce a second gas stream at a second, higher temperature than the temperature of the first gas stream;
   maintaining the second gas stream at substantially the second higher temperature;
   passing the second gas steam from the one or more reactors to the inlet of an expansion turbine without a substantial change in temperature; and
   expanding the second gas stream in the turbine to produce mechanical work from the turbine.

2. The process of claim 1 further including the step of passing the second gas stream to a downstream heat engine to produce additional mechanical work.

3. The process of claim 1 in which said reactive gas stream is from a methanol synthesis process.

* * * * *